Jan. 17, 1933.  B. A. WESCHE  1,894,928
VARIABLE SPEED REACTOR CONTROL
Filed June 5, 1929  3 Sheets-Sheet 2
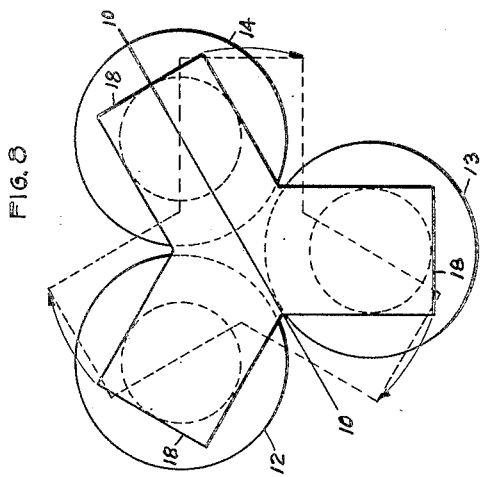
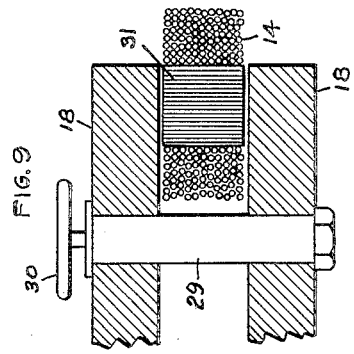
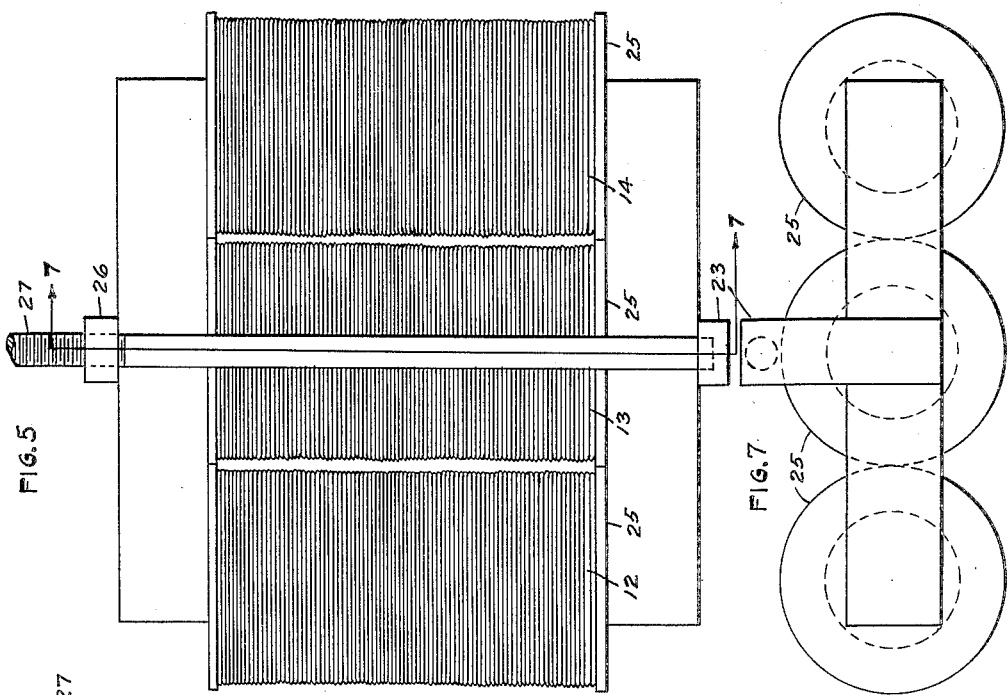
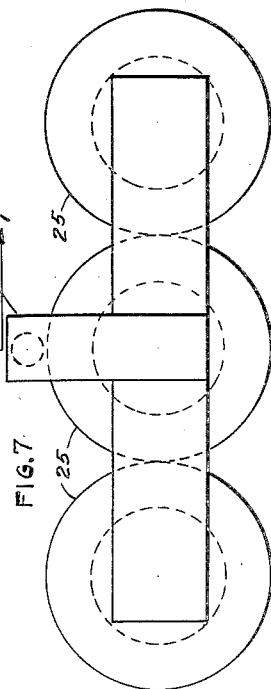
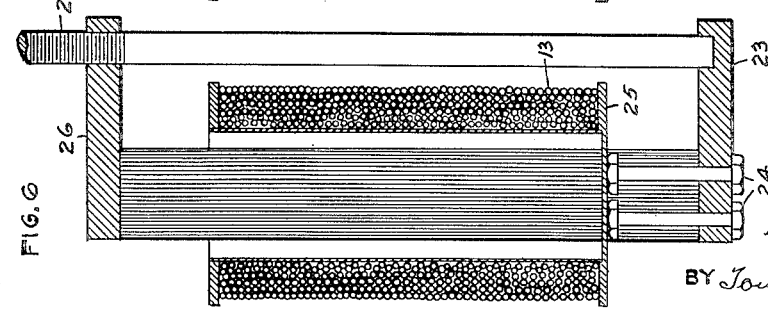
INVENTOR
BJARNE A. WESCHE.
BY Toulmin & Toulmin
ATTORNEYS

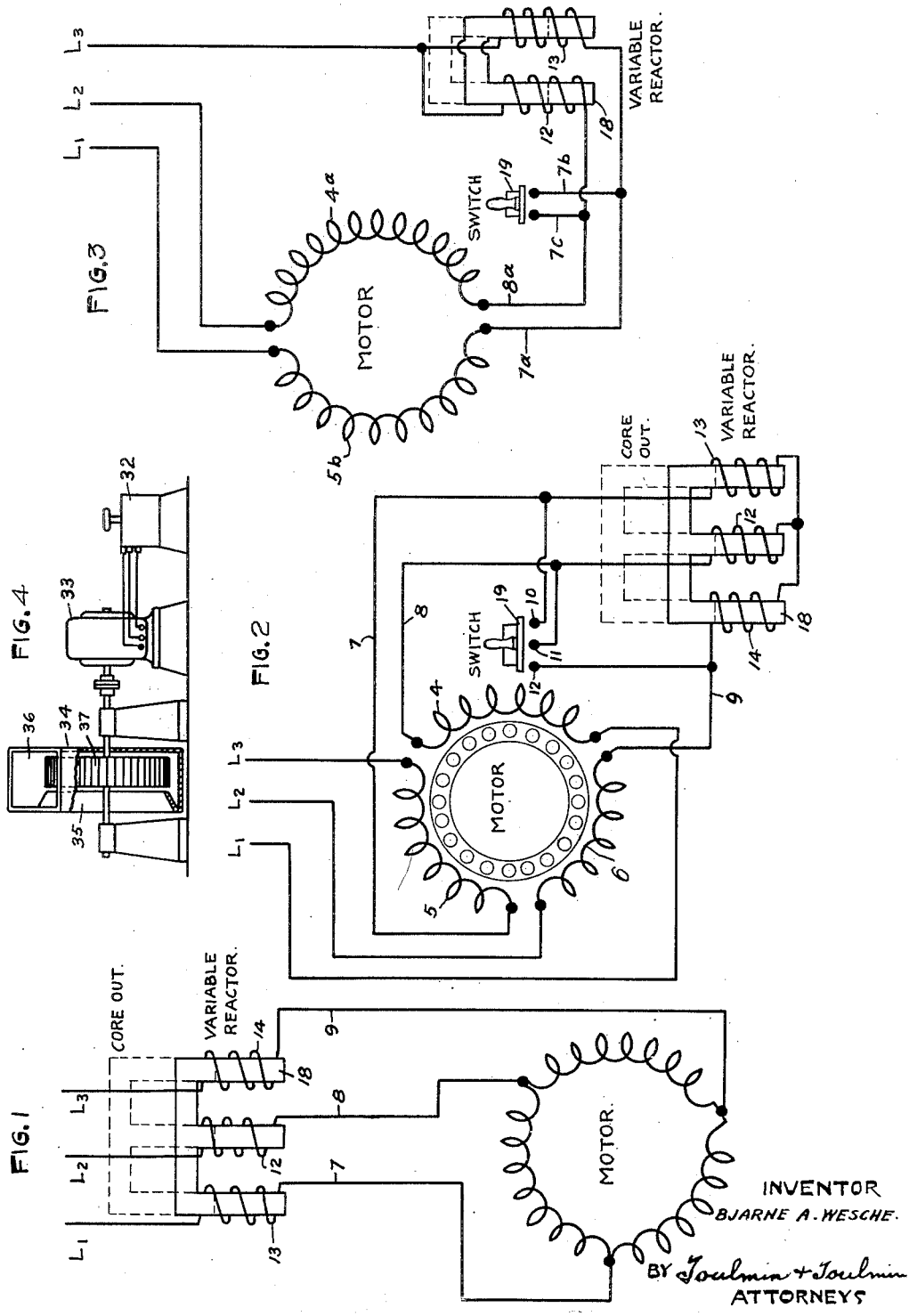

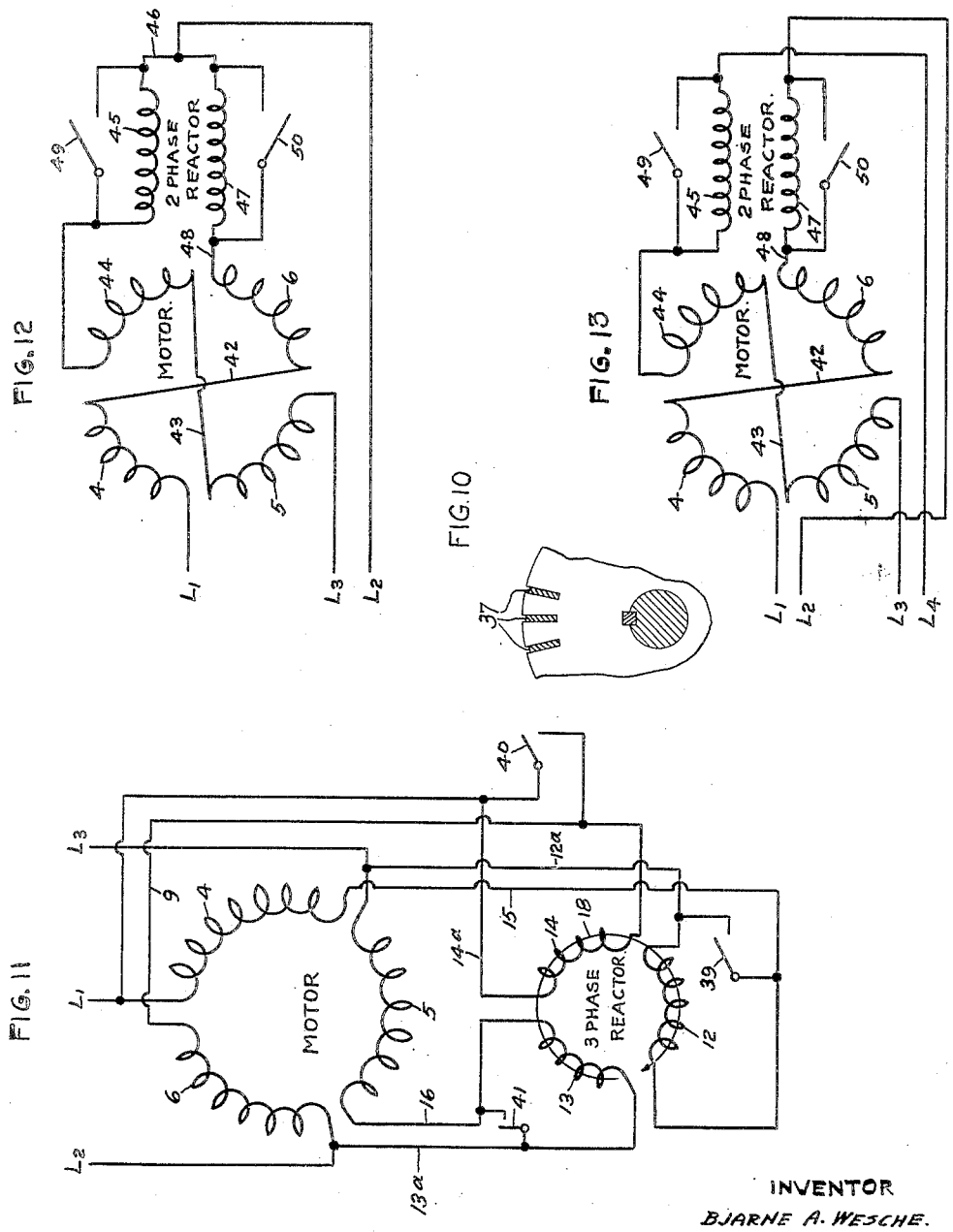

Patented Jan. 17, 1933

1,894,928

UNITED STATES PATENT OFFICE

BJARNE A. WESCHE, OF CINCINNATI, OHIO

VARIABLE SPEED REACTOR CONTROL

Application filed June 5, 1929. Serial No. 368,599.

My invention relates to electric motors and particularly to the control of speeds thereof.

It is an object of my invention to provide a simple and very cheap form of control for electric motors.

It is my particular object to provide such a control for use in connection with motor operating fans where it is desired to vary the speed of the fan without modifying the fan.

It is a further object to provide a squirrel cage, alternating current motor with a variable inductance connected in the primary circuit of the motor so that the field strength of the motor may be varied by a variation of the primary inductance.

It is my object to eliminate the very complicated system of control that heretofore has existed in connection with motors particularly for fan use and also eliminate mech20 anisms now used on fans for varying the position of the fan element or position of the blades of the fan in order to vary the air flow without decreasing the fan speed.

My invention eliminates both of these alternatives and provides a non-adjustable fan, a motor of variable speed and a very simple, cheap, control apparatus.

My invention is adaptable to two-phase, three wire, squirrel cage motors.

Referring to the drawings:

Fig. 1 is an electrical wiring diagram of a three-wire star winding motor having a short circuiting switch and variable inductance;

Fig. 2 is an electrical wiring diagram showing a three-phase, variable speed motor embodying my invention;

Fig. 3 is a similar diagram showing the three-phase, variable speed, squirrel cage motor with the short circuiting switch in position;

Fig. 4 shows a two-phase, three-wire, variable speed, motor embodying my invention;

Fig. 5 is a side elevation of one form of my variable inductance having reciprocating cores;

Fig. 6 is a section on the line 7—7 thereof;

Fig. 7 is a plan view thereof;

Fig. 8 is a top plan view of a rotating core type of variable inductance.

Fig. 9 is a section on the line 10—10 thereof;

Fig. 10 is a detail section through the rotor, showing the winding in which the rotor bars are narrow and much deeper than in the ordinary squirrel cage winding;

Fig. 11 is a wiring diagram showing the application of my invention to the control of the speed of a three-phase, induction motor by means of a three-phase reactor;

Fig. 12 is a wiring diagram showing the application of my invention to an independently operated short circuiting switch and the control of a two-phase, induction motor with the inductance applied to a two-phase, three-wire system;

Fig. 13 is a similar view showing the invention applied to a two-phase, four-wire system.

Referring to the drawings in detail, the wires L—1, L—2 and L—3 are connected to the field windings 4, 5 and 6 of the motor. To these windings there are connected the respective wires 7, 8 and 9 terminating into terminals 10, 11 and 12. Connected across this primary circuit of the motor so that the field strength of the motor may be varied by the variation of the primary impedance is a variable inductance having windings 12, 13 and 14 connected by wires 15, 16 and 17 respectively to the wires 7, 8 and 9. The variable primary inductance is indicated by the core member 18.

In order to short the reactor windings out of the stator windings 4, 5 and 6, I have provided a short circuiting switch 19 which may be closed onto the contacts 10, 11 and 12 of the wires 7, 8 and 9. It will be noted that these wires 7, 8 and 9 are connected at 20, 21 and 22 at the center of the winding group.

Turning to Fig. 2, there will be noted another variation of the application of my invention in the case of a three-phase, variable speed, squirrel cage motor, the primary inductance being shown in its out position in the dotted line. In this case the motor windings are conventionally connected end to end and the wires 7, 8 and 9 suitably taken off at spaced intervals, while the coils 12, 13 and 14 are connected in series to the wires 7, 8 and 9 and the wires L—1, L—2 and L—3.

In Fig. 3 I have shown the adaptation of my invention to a three-phase, variable speed, squirrel cage motor where the arrangement of the parts on similar numbers will be apparent having the same general results.

In Fig. 4 there is a two-phase, three-wire, variable speed, squirrel cage motor having the windings 4a and 5b and the same three-wire system, L—1, L—2 and L—3. The wire L—3 is connected to the free ends of the wires 7a and 8a that are adapted to be short circuited through the wires 7b and 7c and the switch 19. A two-legged, variable inductance is connected into the coils 12 and 13, the free ends of which are connected to the wire L—3.

Referring to the variable reactors as the typical constructions, it will be noted that in the form shown in Figs. 6, 7 and 8 the base 23 has the bolts 24 for supporting the thimbles 25 that carry the coils 12, 13 and 14. The core members 18 of any desired number are adjustably positioned by the head 26 threaded upon the supporting bolt 27 and controlled by the rotation of 27.

In case it is desired to use the form of reactor shown in Figs. 9 and 10, the movable core pieces 18, of which there are three shown in the typical view in Fig. 9, are mounted on a rotating spindle 29 controlled by a hand wheel 30, while the coils have a fixed core 31, the coils being located between the rotatable, movable cores 18. Supporting mechanism for the several parts is omitted for the purpose of clarity, as such detail has purely no design of engineering character or essence of invention.

Referring to Fig. 5, it will be seen there that the variable inductance 32 is connected to the motor, generally designated 33, and the housing is marked 34 and an inlet 35 and outlet 36 with a fan 37 thereon. By varying the speed of the fan through varying the speed of the directly connected motor through simply moving the reactors a varying quantity of air is delivered without adjusting the fan or the fan case. Thus I eliminate all of the mechanical equipment heretofore employed for varying fan equipment to give a variable air flow which is not only expensive, but subject to wear, frequent adjustment and rattling during the high speed at which the parts travel. On the other hand I eliminate complicated electrical control systems and panel switches, speed resistances and the like heretofore employed to vary the speed of the motor and eliminate that form of control of equipment which decreases the efficiency of the motor. In my invention the motor maintains a constant level of efficiency.

As will be seen in Fig. 11, I provide rotor bars 37 that are narrow and much deeper than the ordinary squirrel cage winding in order to take full advantage of the eddy current losses in the reactor bars at low speeds. 38 indicates the rotor core.

In Fig. 12 the line L—1 is connected to the field winding 4, line L—2 to the field winding 6 and the line L—3 to the field winding 5. The coil L—4 is connected by the wire 15 to the reactor coil 12 which is in turn connected by the wire 12a into the line L—3 with an individual short circuiting switch 39 connected across the lines 15 and 12a for individually cutting out the coil 12.

The line L—2 is connected to the coil 6 of the field winding and thence by wire 9 to the coil 14 which in turn is connected by the wire 14a into the line L—1, there being an individual switch 40 short circuiting coil 14 out of operation when closed, such switch being located between the lines 9 and 14a.

The line L—3 is connected to the field winding coil 5 which in turn is connected to the stator coil 13, the free end of which is connected by the wire 13a into line L—2, there being an individual short circuit switch 41 between the lines 16 and 13a.

Thus a much more delicate control can be secured by utilizing the independent short circuiting switches.

Referring to Fig. 13, which is a two-phase, squirrel cage, induction motor diagram utilizing the three-wire system, I have provided two inductor coils with independent switches for controlling each coil.

For instance, the wire L—1 is connected to the field winding 4 which is connected across to the winding 6 by the connection 42, while the winding 5 is connected across by the wire 43 to the winding 44 and thence to the inductor coil 45 which is connected by the wire 46 and inductor coil 47 which in turn is connected to the winding 6 by the wire 48. Short circuiting switches 49 and 50 are adapted to independently cut out of circuit the inductor coils 45 and 47. These two coils are connected to the wire L—2 through the wire 46.

In Fig. 14, there is illustrated a two-phase, squirrel cage, induction motor with independent short circuiting switches adapted to cut out either, or both of the two inductor coils having utilized a four-wire system.

This is a modification of Fig. 13 in that each coil is independently connected to the wires L—2 and L—4 instead of both being connected to the wire L—2 as in Fig. 13.

My system provides for an infinite number of speeds on the fan, whereas some slip-ring induction motors will only give as many speeds as there are contact points on the controller. The total power consumption varies as the fan speed because there is only a negligible amount of power in the reactor itself. The control operates with a low temperature rise as it does not have to dissipate a large amount of heat and, therefore, takes up less space than the ordinary resistance control. As the construction is more rugged and cheaper it requires less attention and maintenance.

It will be understood that I desire to comprehend within my invention and within the scope of my claims such modifications as may be fairly comprehended within such claims and invention due to necessary modifications to adapt my invention to varying conditions of use and to varying purposes.

It will be understood that I do not comprehend within my invention controllers for the starting of motors and I do not comprehend within my invention the variation of the line voltage as applied to the motor to vary the spaced of the motor. I do not comprehend within my invention resistances or compensators, nor resistance or compensator controls.

I comprehend within my invention the use of a substantially constant line voltage as heretofore described and an opposition of my field stator circuit to the line voltage. The change in the voltage and power factor causes a change in the speed of the motor. Otherwise stated I vary the speed and the voltage together and as the voltage decreases the speed likewise decreases and if the voltage increases the speed increases, but the line voltage remains constant as supplied. This results from varying the stator field strength of my motor by a variation of the primary inductance and by the further use of a high inductance rotor. Thus, I vary the voltage as supplied from the inductance to the motor or, as stated heretofore, the power consumption varies the speed. I disclaim all those arrangements, apparatus and circuits where there is a variable inductance in a rotor circuit as that will not get the result of my invention in which I employ a variable inductance in the field winding circuit in combination with a high reactance rotor thereby securing with the constant line voltage a variation in speed and a corresponding variation in voltage utilized by the motor.

"Impedance" has been defined as "the total opposition in an electric circuit to the flow of an alternating current, being made up of the actual or ohmic resistance and the apparent resistance due to self inductance or capacitance."

"Inductance" has been defined as "the coefficient of self induction, the capacity which an electric circuit has of producing induction within itself, or it may be considered as the ratio between the total inductance through a circuit to the current producing it".

On the other hand, we could define reactance as following: "In an alternating current circuit that component of the resistance that does not oppose the current, but tends to cause a difference of phase between it and the electric motor force.

Having thus fully described my invention, what I claim as new and desire to secure by Letters Patent, is:

1. In combination in an alternating current motor of the squirrel cage type, a high resistance secondary having the characteristics of a deep and narrow conductor secondary, a primary circuit and a variable inductance connected into the primary circuit whereby the motor speed is adjusted.

2. In combination in an alternating current motor of the squirrel cage type, a squirrel cage secondary comprising a rotor having relatively deep and narrow bars, and having a high resistance, a primary circuit for said motor, a variable inductance connected into said primary circuit whereby full advantage of the eddy current losses can be secured in said reactor at low speeds.

3. In combination in an alternating current motor of the squirrel cage type, primary field windings for said motor connected to a source of current, a high resistance secondary of said motor comprising a rotor having relatively deep and narrow bars, a variable inductance connected into said primary circuit, and means of short-circuiting said reactor out of said primary circuit.

4. In combination with an alternating current squirrel cage motor having a plurality of motor stator windings connected in a three-phase system and a high reactance secondary having relatively deep and narrow conductor bars, three wires adapted to be connected to a three-phase voltage supply and connected into said windings at spaced intervals, a variable inductance connected into said wires comprising a coil in each wire and cores and means to simultaneously and equally adjust said cores.

5. In combination in an alternating current squirrel cage motor in a three-phase system, three spaced stator windings in said motor, each of said windings being connected at one end to an incoming wire, a wire connecting the other ends of each of said windings to a coil of a variable inductance, a high resistance rotor having relatively deep and narrow bars, said variable inductance comprising said coils and a common adjustable core simultaneously adjustable for all of said coils, said coils being interconnected at their free ends.

6. In combination in an alternating current motor, a stator field winding, an inductance coil connected thereto, a core movable in said coil, a high reactance rotor having relatively deep and narrow bars and a supply line of substantially constant voltage, so that variations in position of the coil and the core will vary the speed of the motor and vary the voltage supplied from the inductance so that the speed and voltage vary together.

7. In combination in an alternating current motor, a stator field winding, an inductance coil connected thereto, an inductance core movable in said coil, a high reactance rotor having relatively deep and narrow bars and a supply line of substantially constant voltage, so that variations in relative position of the coil and the inductance core will vary the speed of the motor and vary the voltage supplied from the inductance to the motor so that the speed and voltage vary together, and means to short circuit said inductance coil and core upon the accomplishment of a predetermined motor speed.

8. A stator winding of an alternating current motor, a supply line connected thereto, a variable inductance reactance connected to said stator winding and a high reactance rotor whereby the voltage applied to the motor will be varied to vary the speed of the motor.

9. In combination in a polyphase induction motor, a high resistance deep and narrow conductor rotor, and an adjustable inductance in each phase of the primary winding whereby the speed of the motor may be adjusted.

10. In combination in an alternating current motor of the squirrel cage type, a high reactance secondary having the characteristics of a deep and narrow conductor secondary, a primary circuit and a variable inductance connected into the primary circuit whereby the motor speed is adjusted.

11. In combination in an alternating current motor, a motor stator field winding and a variable primary inductance connected to said field winding whereby the stator field strength of the motor may be varied by adjusting said inductance therein said motor having relatively deep and narrow rotor bars whereby to utilize eddy current losses in said bars at low speed.

In testimony whereof, I affix my signature.

BJARNE A. WESCHE.